3,342,883
COPOLYMERS OF ISOBUTYLENE AND
ω-MONOHALO-1-ALKENES
Thomas V. Liston, Kentfield, Calif., assignor to Chevron Research Company, a corporation of Delaware
No Drawing. Filed Oct. 7, 1964, Ser. No. 402,353
6 Claims. (Cl. 260—658)

This invention concerns the composition and preparation of modified polyisobutylene sealant materials. More particularly, the invention concerns the composition and preparation of low molecular weight copolymers of isobutylene and ω-monohalo-1-alkenes polymerized with cationic catalysts.

The use of cationic catalyst systems, such as $AlCl_3$—HCl, to polymerize isobutylene is well known. One important use of the polyisobutylene thus formed is as a liquid sealant material. However, such sealants do not possess the important property of being curable at near-ambient temperatures or upon slight heating. Therefore, in some particular applications, such as sealing vehicle windshields, where the sealant must not only be sufficiently liquid to be easily applied but must also be curable in situ so that the sealant will not bleed onto the sealed object, polyisobutylene is unsatisfactory. As a result, industries requiring such liquid, curable sealants have turned to using more costly sealants, such as polysulfide rubber compounds, to solve the problem.

It has now been found that polyisobutylene may be modified in such a way as to render it satisfactory for use as a liquid, curable sealant. Particularly, isobutylene is copolymerized with an ω-monohalo-1-alkene. The copolymerization process comprises adding the ω-monohalo-1-alkene and isobutylene, in a mol ratio of isobutylene to ω-monohalo-1-alkene of from about 10 to 200:1, to a cationic catalyst system comprising an aluminum halide wherein the halogen is from atomic number 17 to 35 and a co-catalyst such as HX, RX or $H_2O$ wherein R represents lower alkyl and X represents chlorine or bromine. The copolymers obtained therefrom have molecular weights of from about 500 to 2,000, are benzene-soluble and contain from about 0.5 to 10 mol percent ω-monohalo-1-alkene. The ω-monohalo-1-alkene groups incorporated in the thus prepared copolymers provide functional sites from which the copolymers may be modified by known methods with ammonia, ammonium hydroxide and carbon disulfide, and lead dioxide to form the curable sealant materials.

The addition sequence between the reactants, i.e., isobutylene and ω-monohalo-1-alkene, and the catalyst system is critical in the invention. The isobutylene and ω-monohalo-1-alkene must be added to the catalyst in order to form the low molecular weight, benzene-soluble copolymers of the invention. The addition of reactants to the catalyst system preferably takes place continuously so as to allow effective copolymerization. It has been determined that when the catalyst system is added to the reactants substantial homopolymerization of the isobutylene occurs. In addition, any copolymers which are formed contain only negligible amounts of ω-monohalo-1-alkene. The copolymers thus formed have high molecular weights and are elastomeric. These latter properties in addition to the low amount of 1-alkene incorporation make such copolymers unsatisfactory as sealants after being further treated.

The ω-monohalo-1-alkenes which find use in preparing the copolymers of the invention have from 5 to 12 carbon atoms and a halogen of atomic number 17 to 35. In such alkenes the halogen is necessarily positioned at least gamma to the nearest olefinic carbon atom, e.g., $$H_2C=CH-C^\alpha-C^\beta-C^\gamma$$

Preferred compounds are the straight chain ω-monohalo-1-alkenes. Particularly preferred are the straight chain ω-bromo-1-alkenes.

Illustrative of the ω-monohalo-1-alkenes included within the range of useable alkenes are 5-chloro-1-pentene, 6-bromo-4-methyl-1-hexene, 8-bromo-1-octene, 10-chloro-1-decene, etc.

The cationic catalyst systems used in the invention comprise an inorganic aluminum halide wherein the halogen is of atomic number 17 to 35 and a co-catalyst which gives rise to protons or carbonium ions. Suitable co-catalysts are selected from the group consisting of HX, RX, and $H_2O$ wherein X represents a halogen of atomic number from 17 to 35 and R represents lower alkyl, i.e., from 1 to 6 carbon atoms.

Illustrative catalyst systems include $AlBr_3$-HBr, $AlCl_3$-HCl, $AlCl_3$-$H_2O$, $AlBr_3$-$C_2H_5Br$, $AlCl_3$-$C_3H_7Br$, etc.

The proportion of aluminum halide to co-catalyst may vary widely. However, proportions in the range of from 10 to 1:1 will generally be used.

The proportion of isobutylene to ω-monohalo-1-alkene may also vary depending upon the amount of ω-monohalo-1-alkene desired to be incorporated into the copolymer. Usually, however, to form copolymers which are satisfactory for further treatment, mol ratios of isobutylene to ω-monohalo-1-alkene in the range of from about 10 to 200:1 will be employed. Within this range essentially complete incorporation of the ω-monohalo-1-alkene occurs to yield low molecular weight benzene-soluble copolymers susceptible to further modification.

Solvents used in the polymerization are ordinarily inert hydrocarbons or halohydrocarbons, with aliphatic hydrocarbons particularly preferred. Illustrative solvents are propane, methyl chloride, octane, pentane, chlorohexane, etc.

The polymerization is conducted under conditions at which the reactants involved remain in the liquid state. Either the temperature or the pressure may be varied to maintain the reactants in liquid form. Generally, temperatures and pressures are used at which the reaction mixture will reflux. Therefore, the solvent used will effect the temperature and pressure needed. Since controlling pressure is usually less expensive than controlling temperature, the copolymers would likely be produced commercially in a pressurized medium.

The copolymers obtained are benzene-soluble and have molecular weights in the range of from about 500 to 2,000. They usually have a random structure, that is, the ω-monohalo-1-alkene groups are randomly oriented on the isobutylene backbone.

Illustrative of copolymers of this invention are 5-chloro-1-pentene copolymerized with isobutylene, 6-bromo-1-hexene copolymerized with isobutylene, 7-chloro-4-methyl-1-heptene copolymerized with isobutylene, 8-bromo-1-octene copolymerized with isobutylene, etc.

The preferred copolymers have from about 0.5 to 10 mol percent of ω-monohalo-1-alkene and from 90 to 99.5 mol percent of isobutylene. This amount of ω-monohalo-1-alkene groups supply sufficient chemically active sites from which the copolymers may be further treated.

The further treatment of the copolymers to form a material useable as a curable sealant is well known in the art. First, the copolymers are heated to temperatures between 50 and 100° C. in the presence of an excess of ammonia. The resulting ammonolyzed copolymers are then mixed with about 1 to 5% by weight of carbon disulfide and about 1 to 5% by weight of ammonium hydroxide. This mixture is a stable paste composition which, in the art, would be termed a base compound.

In order to form a curable sealant, this base compound is mixed with an accelerator consisting essentially of lead dioxide. (Other accelerators, such as manganese dioxide may also be employed.) When mixed with the accelerator, the base compound becomes a rubber-like sealant material capable of being easily applied as a calk. Optionally the accelerators may be dispersed in a plasticizer before mixing with the polymer. A typical plasticizer for this purpose is di-n-butyl phthalate. This sealant cures at ambient temperatures. Heat may be applied to speed the curing process. At ambient temperatures the material has a worklife (the period between the mixing of the base and the accelerator and the point at which the sealant becomes a rigid solid) of approximately three hours.

The following examples are given by way of illustration and are not intended to limit or restrict the invention.

*Example 1*

A 500 ml. flask fitted with a Dry Ice reflux condenser and a stirrer was cooled to approximately −44° C. in a Dry Ice-acetone bath. To this flask were charged 188 ml. liquid propane, 2.67 gm. $AlBr_3$ and finally 56 ml. of gaseous HBr was metered into the flask. To this catalyst mixture 0.5 mole of isobutylene and 0.05 mole of 8-bromo-1-octene were added conjointly over a continuous period of 30 minutes. Temperature was maintained at −44° C. and the contents were constantly stirred. After this period, stirring and cooling were ceased and ~10 ml. of isopropyl alcohol were added to the reaction mixture. The mixture was then decanted into a beaker and the volatiles were allowed to evaporate leaving an oily product.

The resulting oily copolymer product was determined to be 100% soluble in benzene and to have a number average molecular weight of 904. The percentage incorporation of the 8-bromo-1-octene into the copolymer was determined to be 100%.

Table 1 is a listing of similar isobutylene-8-bromo-1-octene copolymers prepared according to the above general procedure.

TABLE 1

| Moles [1] IB | Moles [1] 8 BO | Mol. Ratio IB/8 BO | Mol. Wt. Copolymer | Percent 8 BO Incorporation | Catalyst System | Solvent |
|---|---|---|---|---|---|---|
| 20 | 0.5 | 40 | 879 | 70 | $AlBr_3$/HBr | $C_3H_8$ |
| 20 | 0.5 | 40 | 628 | 100 | $AlBr_3$/EtBr | $CH_2Cl_2$—$C_3H_8$ |
| 20 | 0.125 | 160 | 1,164 | 100 | $AlBr_3$/HBr | $C_3H_8$ |
| [2] 50 | 1.25 | 40 | 1,522 | 89 | $AlCl_3$/HCl | $C_4H_{10}$ |

IB=Isobutylene; 8 BO=8-bromo-1-octene; EtBr=Ethyl bromide.
[1] Moles/100 moles solvent.
[2] Temp.=0° C., Addition time=10–20 minutes.

*Example 2*

In comparison, copolymers were made in the above manner except that an aluminum bromide-ethyl bromide catalyst system in a $CH_3Cl$-$C_3H_8$ solvent were added to various mixtures of isobutylene and 8-bromo-1-octene. The molecular weights of these copolymers ranged from 56,000 to 104,000. Most of these copolymers showed no more than 36% incorporation of 8-bromo-1-octene.

The following example illustrates the method by which the copolymers of the invention may be ammonolyzed and further modified to form a curable sealant material.

*Example 3*

A reaction vessel was charged with 30 g. of the copolymer of Example 1 dissolved in 200 ml. of benzene. This solution was heated to 80° C. and treated with a 200-fold excess of liquid $NH_3$. After $NH_3$ treatment the mixture was allowed to cool, the excess $NH_3$ being vented. The mixture was then treated with 100 ml. of 50% aqueous sodium hydroxide to neutralize any ammonia-bromine complexes formed. The benzene layer was separated from the aqueous layer and then the benzene was stripped off to leave the ammonolyzed copolymer. The nitrogen content of the copolymer was determined to be 1.5 weight percent. This amount was calculated as indicating a 77% conversion of —Br to —$NH_2$. To 5.0 g. of the ammonolyzed copolymer 0.30 g. of 30% aqueous ammonium hydroxide solution and 0.41 g. carbon disulfide were added to form a stable base composition.

To this base composition 1.3 g. of lead dioxide were added. The resulting rubbery sealant material solidified at room temperature within 3–5 hrs.

As will be evident to those skilled in the art, various modifications on this process can be made or followed, in light of the foregoing disclosure, without departing from the spirit or scope of the disclosure or from the scope of the following claims.

I claim:
1. A process for making low molecular weight copolymers of an ω-monohalo-1-alkene and isobutylene which comprises adding an ω-monohalo-1-alkene having from 5 to 12 carbon atoms wherein said halogen is of atomic number 17 to 35 and isobutylene, the mol ratio of isobutylene to ω-monohalo-1-alkene being from about 10–200:1, to a catalyst system comprising an aluminum halide wherein said halide is of atomic number 17 to 35 and a co-catalyst selected from the group consisting of HX, RX and $H_2O$ wherein X represents a halogen of atomic number 17 to 35 and R represents lower alkyl, in the presence of an inert solvent, and recovering therefrom a copolymer of from about 0.5 to 10 mol percent of ω-monohalo-1-alkene and from about 90 to 99.5 mol percent of isobutylene.

2. The process according to claim 1 wherein said catalyst system comprises aluminum chloride and hydrogen chloride.

3. The process according to claim 1 wherein said catalyst system comprises aluminum bromide and hydrogen bromide.

4. The process according to claim 1 wherein said ω-monohalo-1-alkene is 8-bromo-1-octene.

5. The copolymer prepared by the process of claim 1.

6. The copolymer prepared by the process of claim 1 wherein the ω-monohalo-1-alkene is 8-bromo-1-octene.

References Cited

UNITED STATES PATENTS

| | | | |
|---|---|---|---|
| 2,336,648 | 12/1943 | Sparks | 260—87.5 |
| 2,379,292 | 6/1945 | Gleason. | |
| 2,390,621 | 11/1945 | Shoemaker et al. | 260—94.8 |
| 2,551,640 | 5/1951 | Seger et al. | 260—654 X |
| 3,029,231 | 4/1962 | Amerongen | 260—87.5 |

K. V. ROCKEY, T. G. DILLAHUNTY,
  Assistant Examiners.

LEON ZITVER, *Primary Examiner.*